United States Patent
Ducros et al.

(10) Patent No.: US 9,701,079 B2
(45) Date of Patent: Jul. 11, 2017

(54) METHOD AND DEVICE FOR THE PERFORATED CUTTING OF A REINFORCING PLY

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Thierry Ducros, Clermont-Ferrand (FR); Stéphane Ravat, Clermont-Ferrand (FR); Michel Deboeuf, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 158 days.

(21) Appl. No.: 14/366,036

(22) PCT Filed: Dec. 12, 2012

(86) PCT No.: PCT/EP2012/075159
§ 371 (c)(1),
(2) Date: Jun. 17, 2014

(87) PCT Pub. No.: WO2013/092325
PCT Pub. Date: Jun. 27, 2013

(65) Prior Publication Data
US 2015/0000483 A1    Jan. 1, 2015

(30) Foreign Application Priority Data
Dec. 19, 2011 (FR) .................................... 11 61907

(51) Int. Cl.
*B29D 30/00* (2006.01)
*B26D 1/00* (2006.01)
(Continued)

(52) U.S. Cl.
CPC ....... *B29D 30/0061* (2013.01); *B26D 1/0006* (2013.01); *B26D 3/003* (2013.01);
(Continued)

(58) Field of Classification Search
CPC ................. B26D 1/0006; B26D 3/003; B26D 2001/006; B26D 2001/0046; B26F 1/384;
(Continued)

(56) References Cited

U.S. PATENT DOCUMENTS 5,038,999 A  *  8/1991  Dicker ................... B42D 5/025
                                                  229/69
5,618,362 A      4/1997  Janus et al. ................... 152/530
(Continued)

FOREIGN PATENT DOCUMENTS

DE         840 497        6/1952
EP      0 447 273 A2      9/1991
(Continued)

*Primary Examiner* — Phong Nguyen
(74) *Attorney, Agent, or Firm* — Fitzpatrick, Cella, Harper & Scinto

(57) ABSTRACT

A cutting blade, which is useable for cutting a reinforcing strip into reinforcing plies, includes one or more notches disposed at given intervals. When a volume of rubber separating two reinforcing threads is cut by the cutting blade, bridges of rubber are left between a rear edge of a first reinforcing ply and a front edge of a second reinforcing ply.

6 Claims, 2 Drawing Sheets

(51) Int. Cl.
  *B29D 30/46*  (2006.01)
  *B26D 3/00*  (2006.01)
  *B26F 1/38*  (2006.01)
  *B29L 30/00*  (2006.01)

(52) U.S. Cl.
  CPC ............ *B26F 1/384* (2013.01); *B26F 1/3866* (2013.01); *B29D 30/46* (2013.01); *B26D 2001/006* (2013.01); *B26D 2001/0046* (2013.01); *B29D 2030/466* (2013.01); *B29L 2030/003* (2013.01); *Y10T 83/0443* (2015.04); *Y10T 83/9403* (2015.04)

(58) Field of Classification Search
  CPC ... B26F 1/3866; B29D 30/46; B29D 30/0061; B29D 2030/466; B29L 2030/003; Y10T 83/9403; Y10T 83/0443
  See application file for complete search history.

(56) References Cited

U.S. PATENT DOCUMENTS

| | | | |
|---|---|---|---|
| 7,434,500 B2 * | 10/2008 | Dale' | B29D 30/46 83/16 |
| 8,424,673 B2 | 4/2013 | Ravat et al. | 198/679 |
| 2012/0090755 A1 | 4/2012 | Deal | 152/527 |
| 2012/0090756 A1 | 4/2012 | Le Clerc | 152/527 |
| 2013/0199349 A1 | 8/2013 | Ravat et al. | 83/14 |

FOREIGN PATENT DOCUMENTS

| | | |
|---|---|---|
| EP | 0 664 229 A1 | 7/1995 |
| GB | 482754 | 4/1938 |
| GB | 1 305 829 | 2/1973 |
| GB | 1 535 689 | 12/1978 |
| JP | 2005-161851 A | 6/2005 |
| WO | WO 2010/049266 A1 | 5/2010 |
| WO | WO 2010/115860 A1 | 10/2010 |
| WO | WO 2010/115861 A1 | 10/2010 |
| WO | WO 2011/076558 A1 | 6/2011 |

* cited by examiner

Fig 1
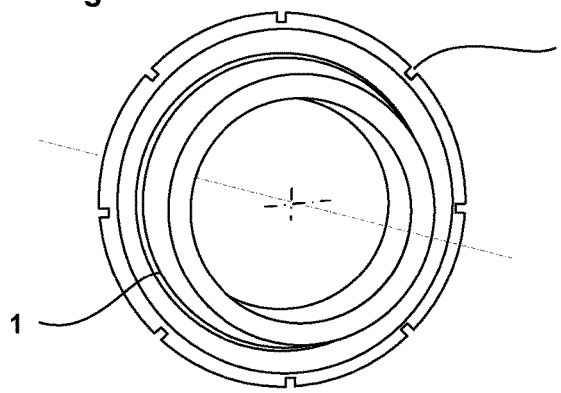
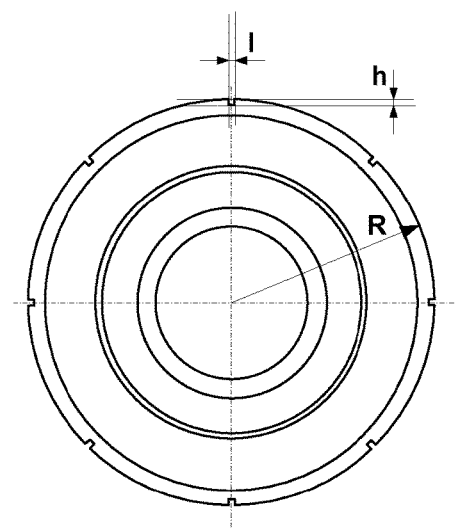
Fig 2
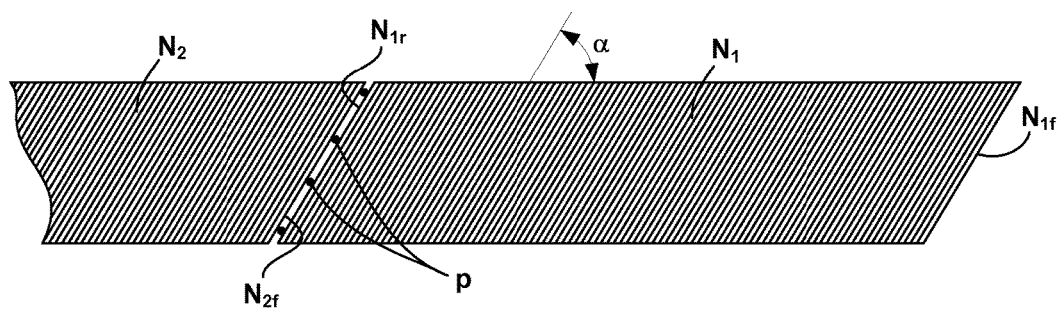
Fig 3

METHOD AND DEVICE FOR THE PERFORATED CUTTING OF A REINFORCING PLY

FIELD OF THE INVENTION

The invention relates to the field of manufacturing tyres, and more particularly the reinforcing plies intended to be employed in the construction of tyres. These reinforcing plies, which are intended for the construction of tyres, are generally formed of portions of threads that are coated in rubber and form a given angle with the longitudinal direction.

More specifically, the invention relates to the cutting and the passage of the reinforcing plies between two transfer belts.

RELATED ART

The manufacture of these plies is widely known from the prior art and consists in removing, from a continuous ply, known as a straight ply, in which the threads are parallel to the longitudinal direction, portions of plies of a given width at a given cutting angle, said portions of plies being known hereinafter as widths. These widths are placed end-to-end in order to form a continuous reinforcing strip in which the portions of thread form a given angle with the longitudinal direction of the reinforcing strip.

In a subsequent step of the tyre-building process, portions of reinforcing ply, also known as reinforcing plies, are removed from the reinforcing strip. The length of these reinforcing plies is precisely adapted to suit the circumference for the laying of said reinforcing ply on the tyre-building means.

The reinforcing ply is cut by disposing the strip on a suitable anvil and passing a cutter, which is generally circular, between two reinforcing threads. Following this operation, the reinforcing ply is in the form of a parallelogram, the front and rear edges of which form a given angle $\alpha$ with the longitudinal direction of the reinforcing ply.

The reinforcing ply is then transferred from a cutting belt to a laying belt configured to receive the ply pending tyre building and moving the ply towards the receiving surface at the appropriate moment in the tyre-building cycle.

However, it has been observed that the lines formed by the front and rear edges of the reinforcing ply do not remain rectilinear and deform in an uncontrolled manner under the effect of the internal stresses in the product. As a result, when the reinforcing ply is laid and the front and rear edges are butt-jointed, it is often necessary to involve an operator to align the edges and to avoid overlaps or openings between threads along the butt joint of the two edges.

Therefore, in order to make it possible to lay these products with the aid of automatic means that do not involve human operators, numerous devices have been proposed to contain the geometric variations of these products within ever tighter tolerances that are acceptable to the users of the tyres.

BRIEF DESCRIPTION OF THE INVENTION

The object of the invention is to propose a method and a device that are able to help improve the overall effectiveness of a device for cutting and laying reinforcing plies at an angle.

Specifically, it has been observed that the majority of the stresses that deform the front and rear edges arise at the time of cutting, when the cutter passes between the threads and cuts the bridge of rubber disposed between these threads. In addition, the passage of the reinforcing ply onto the anvil, which in most installations is disposed in a manner projecting above the cutting belt, has the effect of placing the ply under tension and abnormally stretching the volumes located between two threads, in particular in the areas close to the selvedges of the reinforcing ply.

On account of the plasticity of rubber-based materials, these stresses tend to diminish over time, and virtually disappear after around ten seconds.

The method according to the invention builds on this observation and comprises steps during which portions of ply of a given length are removed from a reinforcing strip by cutting through the rubber located between two adjacent threads of said strip, so as to separate the rear edge of the ply from the front edge of the following reinforcing ply.

This method is characterized in that the cut is interrupted at predetermined intervals in order to leave bridges of rubber between the two ply edges.

These bridges of rubber are sufficiently fragile to break when a slight pull is exerted on the reinforcing ply. It then suffices to detach the rear edge of the ply to be laid a few moments after cutting, ideally just before the ply is laid on the receiving surface, so as to allow the edges to relax into an ideal geometric position, in order to reduce the deformations of the edges once the edges have been freed.

Preferably, the threads of the reinforcing ply form an angle $\alpha$ of between 45° and 90° with the longitudinal direction, such that the stresses exerted on the rubber edges when the bridges of rubber are pulled on in order to break them do not cause other undesired deformations.

Ideally, the bridges of rubber have a length, measured along a thread of the edge, of between 0.5 mm and 2 mm.

In order to ensure that the edges are held properly, the bridges of rubber are advantageously spaced apart by a length, measured along a thread of the edge, of between 1 cm and 15 cm, and preferably between 2 and 10 cm.

Next, the reinforcing ply is detached from the reinforcing strip by stretching the bridges of rubber located between the rear edge of the reinforcing ply and the front edge of the following reinforcing ply until said bridges of rubber break.

In order that the effects of the stabilization of the edges are perceptible, the rear edge of the reinforcing ply is separated from the front edge of the following ply after a given relaxation time which is preferably, depending on the calendering rubbers that are used, at least greater than ten seconds.

Preferably, a reinforcing ply is detached from the reinforcing strip during the tyre-building cycle, when the cycle time is greater than the desired minimum relaxation time.

The invention also relates to a cutting blade, characterized in that the cutting part of the blade comprises one or more notches disposed at given intervals.

Preferably, the cutting blade is formed by a disc, the cutting part of which is approximately circular.

In order to ensure correct spacing of the bridges of rubber, the notches are spaced apart circumferentially by a length of between 1 cm and 15 cm, and preferably between 2 cm and 10 cm.

Similarly, the notches have a width, measured in the direction of the cutting wire, of between 0.5 mm and 2 mm.

Finally, the invention relates to a cutting device for cutting a reinforcing strip, comprising a cutting blade according to the invention, and to a method in which reinforcing plies are produced with the aid of said cutting device.

BRIEF DESCRIPTION OF THE DRAWINGS

The following description is supported by FIGS. 1 to 6, in which:

FIGS. 1 and 2 show a cutting blade according to the invention,

FIG. 3 shows a reinforcing ply obtained with the aid of a method according to the invention.

DETAILED DESCRIPTION OF EMBODIMENTS OF THE INVENTION

Figure 4:
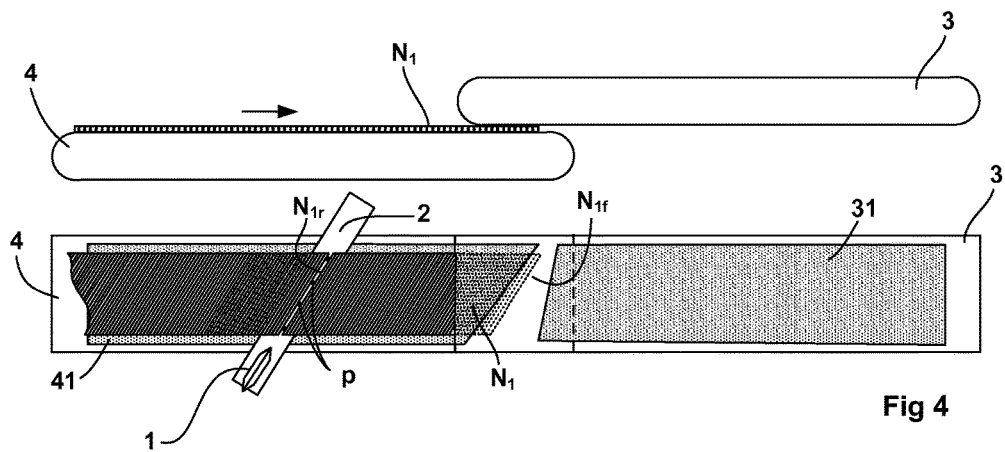
FIGS. 4 to 6 show an implementation example of the method according to the invention.

A reinforcing ply is obtained, in a known manner, from a reinforcing strip that is formed by mutually parallel reinforcing threads that are coated in a rubber mixture and form an angle α with the longitudinal direction, in that a circular cutting blade is rolled between two threads that are located alongside one another, with a controlled pressure being exerted, so as to cut through the thickness of rubber located between these two reinforcing threads. In order to make this operation easier, the rubber strip can usefully be positioned on an anvil that forms an identical angle with the direction of progression of the cutting device so as to react the forces applied to the blade.

It is likewise possible to free the movement of the blade along an axis parallel to the rotation axis of the blade so as to avoid damaging the edges of the reinforcing threads during the passage of the blade. Similarly, the diameter of the cutting blade will be judiciously chosen to ensure the best guidance of the blade by the two adjacent threads bordering the cutting edge.

FIGS. 1 and 2 show a cutting blade according to the invention, formed by a circular disc of radius R, the cutting part of which is disposed on the radially outer part of the disc. It will be seen that this cutting blade has notches 10 disposed at regular intervals on its cutting part. The cutting wire of the blade is thus interrupted at each of these notches.

During the cutting of a continuous strip of the reinforcing strip in order to remove a reinforcing ply $N_1$ therefrom, the blade cuts the thickness of rubber disposed between two contiguous threads apart from the parts located in line with the notches 10 and leaves bridges of rubber p of a small width between the two reinforcing threads, as is illustrated in FIG. 3.

The result, still with reference to FIG. 3, is that the rear edge $N_{1r}$ of the reinforcing ply $N_1$ remains secured to the front edge $N_{2f}$ of the reinforcing strip or of the following reinforcing ply $N_2$. In this way, the edges of the two plies, $N_{1r}$ and $N_{2f}$, are held together by way of the bridges p, thereby preventing these edges from deforming during the relaxation time of the freshly cut-through rubber.

This relaxation time may be very short, around ten seconds, for the effect on the straightness of the edges to be significant. However, it may be possible advantageously to leave the two edges secured together for a longer time, effecting this detachment as late as possible at a time in the tyre-building cycle that is judiciously chosen, as will be seen below.

By exerting a slight pull on the reinforcing ply $N_1$, the bridges of rubber p are made to break and the reinforcing ply is then detached from the reinforcing strip by separating the edges $N_{1r}$ and $N_{2f}$. It will be seen at this stage that, when the angle α of the ply with the longitudinal direction is too small, there is a risk of stretching of the points and deformation of the edges during this operation. Therefore, it appears to be preferable to limit the use of this method to reinforcing plies in which the threads form an angle of between 45° and 90° with the longitudinal direction.

The notches are disposed at given intervals around the circumference of the cutting blade and their spacing determines the spacing between two bridges p. Preferably, the notches are disposed in a regular manner in order to ensure a regular distance between the bridges of rubber, but it is quite possible to circumferentially position said notches at variable distances depending on the sought-after rigidity effects.

By way of example, for a circular blade with a radius of 30 mm and comprising 8 equidistant notches, the bridges are spaced apart by $$\frac{2\pi \times 30}{8},$$

i.e. around 23.5 mm.

The depth h of the notches must be greater than or equal to the thickness of the volume of rubber included between two reinforcing threads, and can vary from 1 mm to 5 mm, or even 6 mm for very thick reinforcing plies.

The width I of the notches may usefully be between 0.5 mm and 2 mm, but will be as large as said volume of rubber is thick.

The method for producing the reinforcing ply according to the invention is implemented preferably with the aid of a cutting blade as described in the preceding paragraphs. However, it is quite possible to obtain a similar result with the aid of manual means such as a plunging cutter which is introduced between the threads at a regular spacing, or any other similar means.

The following has the purpose of describing a particularly advantageous implementation example of the method and of a device according to the invention, which is applied in the case of reinforcing plies having metal threads.

The complete installation that serves to implement the method may comprise a cutting belt 4 having a magnetized area 41 intended to strongly hold the strip or ply against the top surface of the cutting belt, as is shown in FIG. 4.

An orientable anvil 2 that forms an angle α with the longitudinal direction of the laying belt is disposed between the top surface of the cutting belt 4 and the strip $N_2$. A cutting device comprising a cutting blade 1 according to the invention cooperates with said anvil 2.

A laying belt 3, also having a magnetized area 31 intended to hold the reinforcing ply firmly against the bottom face of said belt, is positioned downstream of the first cutting belt. The laying belt is generally positioned directly in line with the receiving surface (not shown) on which the components that form the tyre are assembled.

The downstream part of the cutting belt 4 and the upstream part of the laying belt 3 overlap over a given length, such that the magnetized faces of each of the belts are opposite one another without themselves overlapping. This results in an area free of the influence of the magnetized areas and corresponding to the area for transferring the reinforcing ply from the cutting belt to the laying belt.

The reinforcing ply can thus travel from the top face of the cutting belt 4 to the bottom face of the laying belt 3.

For more information relating to this type of cutting and transferring installation, reference may be made usefully to the publication PCT/EP2009/063320, which describes a similar installation.

The reinforcing strip $N_2$ is disposed on the cutting belt and travels, under the advancing effect of the belt, from upstream to downstream in the installation in the direction of the arrow. Means (not shown) make it possible to measure the length of the strip included between the front edge $N_{2f}$ and the anvil, and control the stopping of the cutting belt when the desired length, corresponding to the laying length of the ply, has been reached.

The cutting blade 1 of the type according to the invention is then actuated, said cutting blade 1 travelling along the anvil 2 between two reinforcing threads so as to cut through the thickness of rubber included between the two threads. The bridges p prevent the rear edge $N_{1r}$ of the ply $N_1$ from detaching from the front edge $N_{2f}$ of the following ply $N_2$.

Figure 5:
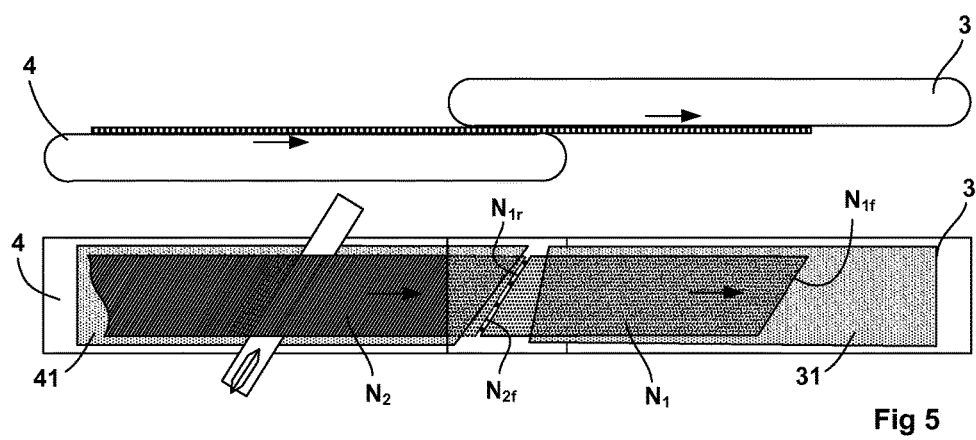

The ply $N_1$ is then made to travel along the cutting belt 4 until the front edge $N_{1f}$ of the ply is in line with the downstream part of the laying belt 3. Next, the ply $N_1$ is made to pass from the cutting belt 4 under the laying belt 3 until the rear edge $N_{1r}$ of the ply $N_1$, still secured to the front edge $N_{2f}$ of the ply $N_2$, is in line with the laying belt 3, as is shown in FIG. 5.

The cutting device and the laying belt then rest, pending the command to transfer the reinforcing ply $N_1$ from the laying belt 3 onto the receiving surface that is used to assemble the components of the tyre.

Figure 6:
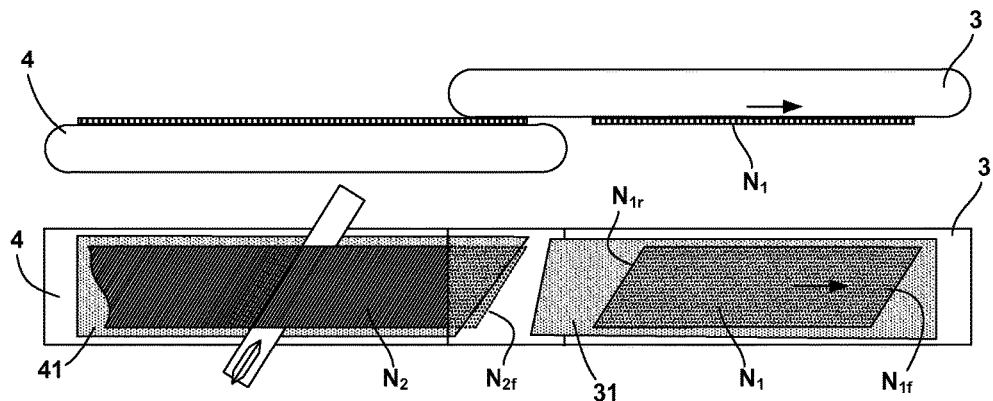

When the command is given, and with reference to FIG. 6, the advancing of only the laying belt 3 is activated, this having the effect of causing the bridges of rubber p to break and to direct the reinforcing ply in the direction of the receiving surface.

It will be observed that, during the period of time in the cycle that is contained between the cutting operation and the command to transfer the ply $N_1$ to the receiving surface, the rear edge $N_{1r}$ of the ply $N_1$ is kept in its angular position by the bridges of rubber p. This period of time is generally greater than about ten seconds and is sufficient to allow the stresses caused by the cutting operation to dissipate. As a result, the freeing of the rear edge $N_{1r}$ of the ply $N_1$ does not cause any disturbance likely to modify the geometry of the edge as it passes through the area without magnetization from the cutting belt 4 to the laying belt 3.

Similarly, once the ply $N_1$ has been laid and the laying belt 3 has been freed, the front edge $N_{2f}$ of the ply $N_2$ is made to pass from the cutting belt 4 to the laying belt 3, this edge being sufficiently stabilized to not also be subjected itself to undesired deformations.

The implementation of the method and of a cutting blade according to the invention thus makes it possible to reduce the effects brought about at the time of cutting by stabilizing the ply edges in a correct geometric position, such that, when these edges clear the area free of magnetization, passing from the cutting belt 4 to the laying belt 3, the internal stresses do not cause any geometric deformation of the edges.

It also appears that the fact of maintaining a connection between the edges of two successive plies during the cut makes it possible to reduce the lateral movement of the widths, this being brought about by the transverse component of the movement of the cutting blade.

The above-described method and device have the aim of demonstrating the advantage of the implementation of a cutting blade and a method according to the invention and are in no way limiting.

Thus, it is also conceivable to cut the reinforcing plies to length at the device for manufacturing the reinforcing strip from what is known as the straight ply.

The continuous reinforcing reinforcing strip is thus made up of a plurality of reinforcing plies that are connected together by way of bridges of rubber.

During the operation of building up the tyre, the reinforcing ply is removed, without having to be cut, from the reinforcing strip by detaching the bridges of rubber. This last operating mode may prove useful when the reinforcing plies are formed from non-metallic threads.

The invention claimed is:

1. A method for producing a reinforcing ply used in a tyre, the ply including reinforcing threads that are coated in a rubber mixture, the threads being arranged parallel to one another and forming a given angle ($\alpha$) with a longitudinal direction of the ply, the method comprising steps of:
   cutting through a rubber portion located between two adjacent threads of a reinforcing strip, so as to separate a rear edge ($N_{1r}$) of a first reinforcing ply ($N_1$) of the reinforcing strip from a front edge ($N_{2f}$) of a second reinforcing ply ($N_2$) of the reinforcing strip; and
   removing the first reinforcing ply ($N_1$) from the reinforcing strip after a predetermined relaxation period has elapsed, the first reinforcing ply ($N_1$) having a given length,
   wherein, in the cutting step, cutting of the rubber portion is interrupted at predetermined intervals in order to leave bridges of rubber between the rear edge ($N_{1r}$) of the first reinforcing ply ($N_1$) and the front edge ($N_{2f}$) of the second reinforcing ply ($N_2$).

2. The method according to claim 1, wherein the threads of the reinforcing ply form an angle ($\alpha$) of between 45° and 90° with a longitudinal direction of the reinforcing ply.

3. The method according to claim 1, wherein the bridges of rubber have a length, measured along a thread at an edge, of between 0.5 mm and 2 mm.

4. The method according to claim 1, wherein the bridges of rubber are spaced apart by a length, measured along a thread at an edge, of between 1 cm and 15 cm.

5. The method according to claim 1, wherein, during the step of removing the first reinforcing ply ($N_1$) from the reinforcing strip, the first reinforcing ply ($N_1$) is detached from the reinforcing strip by stretching the bridges of rubber located between the rear edge ($N_{1r}$) of the first reinforcing ply ($N_1$) and the front edge ($N_{2f}$) of the second reinforcing ply ($N_2$) until the bridges of rubber break.

6. The method according to claim 1, wherein the relaxation period is at least greater than ten seconds.

* * * * *